（12）United States Patent
Meyer

(10) Patent No.: US 6,315,250 B1
(45) Date of Patent: Nov. 13, 2001

(54) ONE-PIECE SWIVEL CLIP AND SWIVEL PRONG

(75) Inventor: Charles Meyer, New Lenox, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/415,821

(22) Filed: Oct. 12, 1999

Related U.S. Application Data

(63) Continuation-in-part of application No. 09/004,432, filed on Jan. 8, 1998.

(51) Int. Cl.$^7$ .................................................... F16L 3/08
(52) U.S. Cl. ........................... 248/74.1; 248/65; 248/544; 248/548
(58) Field of Search ........................... 248/74.1, 65, 544, 248/548, 70, 71, 73, 74.2, 489; 403/164; 411/3, 4, 5

(56) References Cited

U.S. PATENT DOCUMENTS

| | | | |
|---|---|---|---|
| 3,023,990 | * 3/1962 | Gunthel, Jr. | 248/70 |
| 4,518,295 | * 5/1985 | Matuschek | 411/291 |
| 4,582,288 | * 4/1986 | Ruehl | 248/547 |
| 4,669,688 | * 6/1987 | Itoh et al. | 248/74.2 |
| 4,680,837 | * 7/1987 | Rubinstein | 24/237 |
| 4,842,237 | * 6/1989 | Wollar | 248/548 |
| 5,002,243 | * 3/1991 | Kraus et al. | 248/68.1 |
| 5,014,939 | * 5/1991 | Kraus et al. | 248/70 |
| 5,133,523 | * 7/1992 | Daigle et al. | 248/62 |
| 5,367,750 | * 11/1994 | Ward | 24/16 PB |
| 5,397,093 | * 3/1995 | Chubb et al. | 248/544 |
| 5,709,498 | * 1/1998 | Sova et al. | 403/196 |
| 5,799,986 | * 9/1998 | Corbett et al. | 285/55 |
| 5,799,987 | * 9/1998 | Sampson | 285/81 |
| 5,820,048 | * 10/1998 | Shereyk et al. | 248/68.1 |
| 5,984,242 | * 11/1999 | Meyer | 248/65 |

FOREIGN PATENT DOCUMENTS

2218462 * 11/1989 (GB) .................................. 248/74.2

* cited by examiner

*Primary Examiner*—Anita King
*Assistant Examiner*—Kimberly Wood
(74) *Attorney, Agent, or Firm*—Pitney, Hardin, Kipp & Szuch LLP

(57) ABSTRACT

The device is a swivel clip or swivel prong with a relatively rotatable swivel and base elements. The swivel element rotates about a shaft which passes through an aperture in the base element. The swivel clip is initially formed in one piece by molding windows in an upper portion of the swivel element which are opposed to molding windows in a lower portion of the swivel element (that is, alternating around the periphery of the shaft). The windows meet in the base member, forming the swivel shaft, the swivel aperture and the internal gates as a single piece. Subsequently breaking the internal gates provides vestiges which support the swivel shaft within the aperture. Radially oriented upwardly extending inverted V-shaped support boss formed on the swivel and base elements position the swivel and base elements with respect to each other.

7 Claims, 3 Drawing Sheets

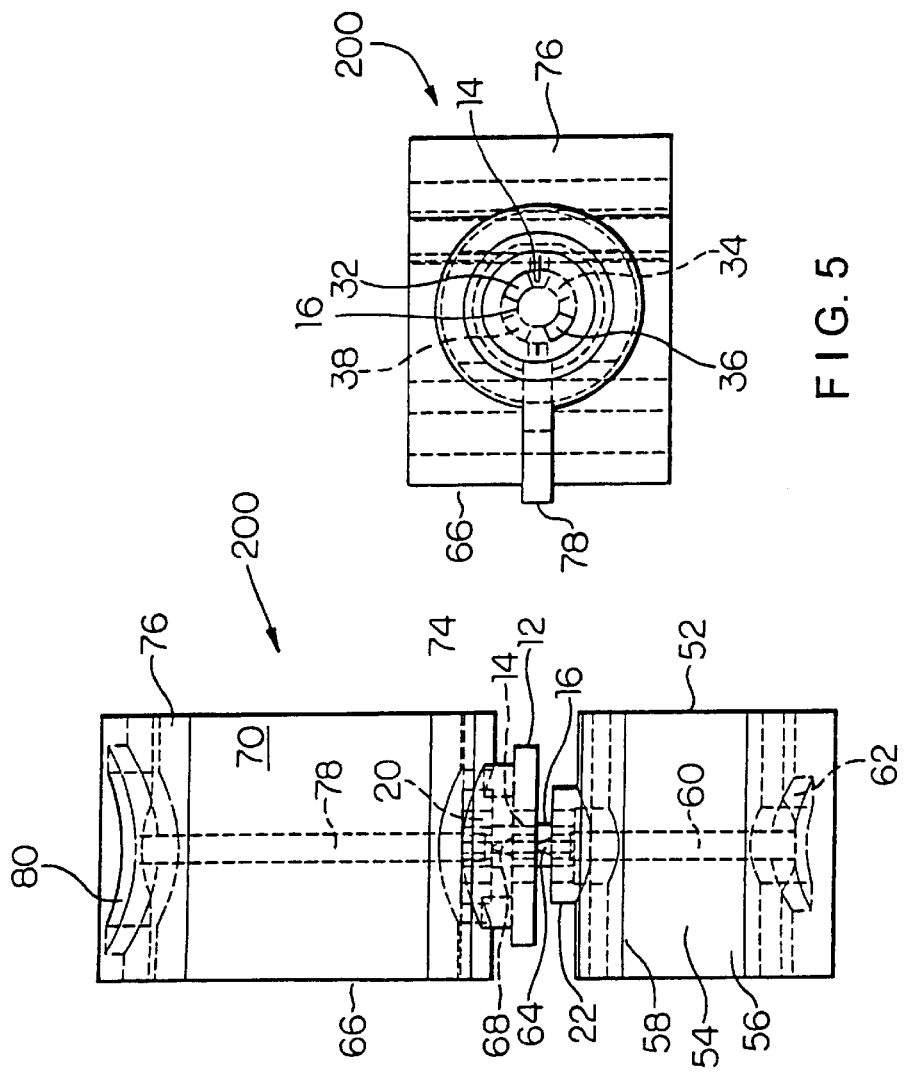
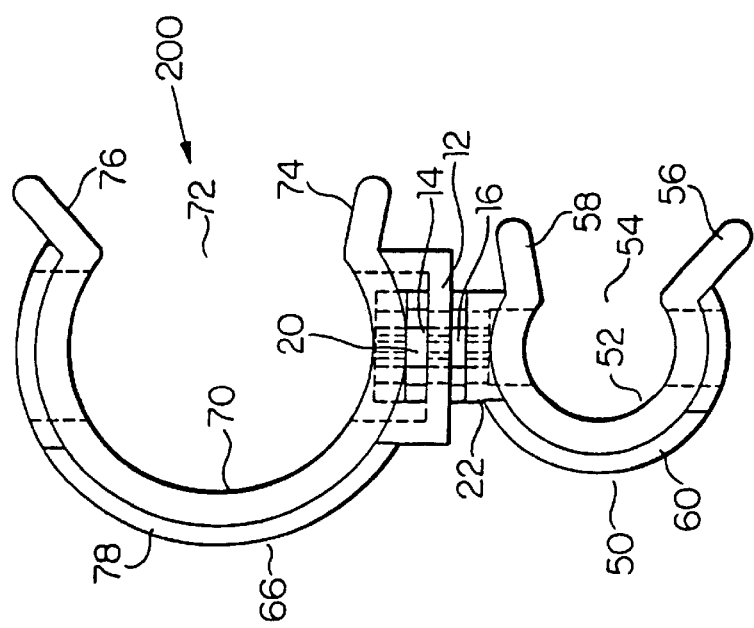

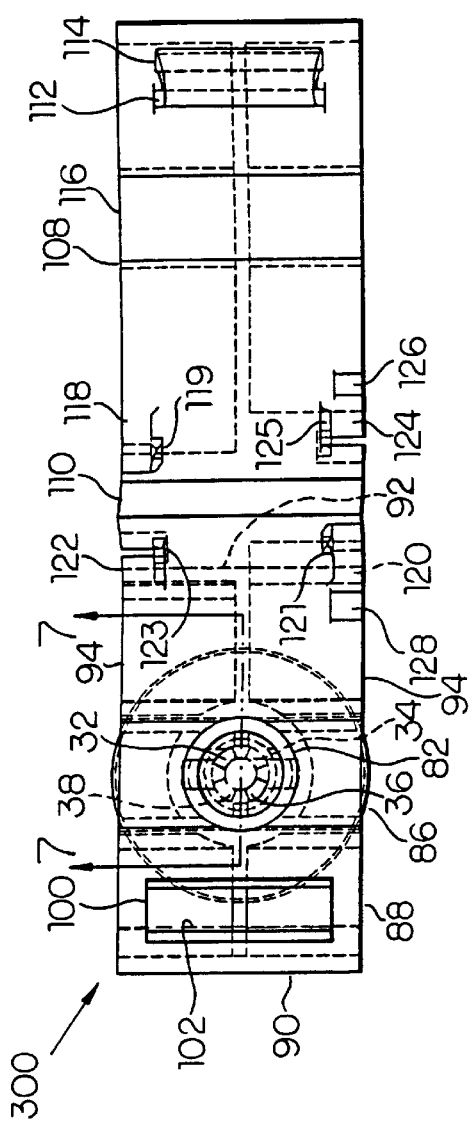

ONE-PIECE SWIVEL CLIP AND SWIVEL PRONG

This application is a continuation-in-part of application Ser. No. 09/004,432, filed on Jan. 8, 1998, entitled "One-Piece Swivel Clip".

BACKGROUND OF INVENTION

1. Field of Invention

This invention pertains to a swivel clip or swivel prong including two relatively rotatable members. Windows are configured in the clip to provide internal gates to fill both members during the molding process. The internal gates are broken prior to use to allow the members to rotate with respect to each other. Support bosses eliminate or minimize endplay during the relative rotation of the members.

2. Description of the Prior Art

In the prior art, swivel clips are frequently molded as two separate pieces which are snapped together after molding. The snap fits typically require a high insertion force to maintain a marginally acceptable retention force. Similarly, clips are sometimes molded as a single piece with snap detent mechanism to engage an aperture in the structure (for example, architectural or automotive structures), but this does not provide an adequate swivel mechanism for some applications, such as tube routing with a variation in the angle of the tubes. Likewise, this does not provide a high retention force, or at a minimum, provides a retention force which is related to the force required for installation of the clip.

Additionally, some prior art clips included a metal-to-plastic rotational interface which was not long-wearing.

Likewise, clips in the prior art, particularly if sized for free rotation, tended to have endplay and to rattle. This is unacceptable for automotive applications.

Examples of prior art in this field include U.S. Pat. No. 4,669,688 to Itoh et al. entitled "Cable Clamp"; U.S. Pat. No. 5,133,523 to Daigle et al. entitled "Suspendable Conduit Bracket Lock System"; U.S. Pat. No. 5,367,750 to Ward entitled "Wiring Harness Clip"; U.S. Pat. No. 4,680,837 to Rubinstein entitled "Plastic Swivel Connector and Mold Therefor"; U.S. Pat. No. 5,002,243 to Kraus et al. entitled "Plastic Holding Device with Noise Dampening"; and United Kingdom Patent Application GB 2,218,462A entitled "Cable Retaining Device".

OBJECTS AND SUMMARY OF THE INVENTION

It is therefore an object of this invention to provide a clip which is molded as a single piece.

It is therefore a further object of this invention to provide a clip with simplified assembly.

It is therefore a still further object of this invention to provide a clip with a retention force which is not limited by any insertion force required during the installation.

It is therefore a still further object of this invention to provide a clip which is long-wearing, preferably without a metal-to-plastic rotational interface.

It is therefore a still further object of this invention to provide a clip with a minimized tendency to rattle.

It is therefore a still further object of this invention to provide a clip with minimized endplay between the two relatively rotatable.

These and other objects are attained by the present invention by providing a clip wherein the two relatively rotatable members are initially formed as a single piece during the molding process. Opposed windows are configured to provide internal gates to fill both members. These opposed windows are used to form the swivel shaft and its accompanying bore. A variety of window, shaft and gate configurations are possible, but common to all is the opposition of the windows. The windows meet in the "female" member forming the swivel shaft, bore and internal gates. The opposition of the windows creates a strong joint between the shaft and discs of the "male" member. After the gates are broken, the vestiges of the gates provide support for the shaft and minimize side play.

The swivel prong configuration of this invention includes a hollow box prong which provides access to create the lower two windows needed to form the flash gate. Both of the relatively rotatable members include support bosses to eliminate endplay through a full revolution.

BRIEF DESCRIPTION OF THE DRAWINGS

Further objects and advantages of the invention will become apparent from the following description and claims, and from the accompanying drawings, wherein:

FIG. 3 is a side plan view, partially in phantom, of the swivel clip embodiment of the present invention.

FIG. 4 is a front view, partially in phantom, of the swivel clip embodiment of the present invention.

FIG. 5 is a top view, partially in phantom, of the swivel clip embodiment of the present invention.

FIG. 6 is a top plan view, partially in phantom, of the swivel prong embodiment of the present invention.

FIG. 7 is a cross-sectional side view along plane 7—7 of FIG. 6 of the swivel prong embodiment of the present invention.

FIG. 8 is a cross-sectional view along plane 8—8 of FIG. 7 of the swivel prong embodiment of the present invention.

FIG. 9 is a cross-sectional view of along plane 9—9 of FIG. 7 of the swivel prong embodiment of the present invention showing, in particular, the support boss structure.

DETAILED DESCRIPTION OF THE PREFERRED EMBODIMENTS

Figure 1A:
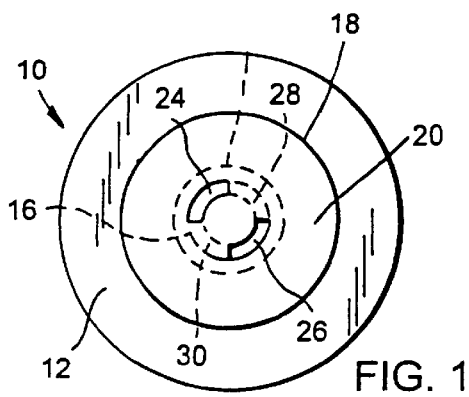
FIG. 1A is a top plan view, partly in cross section, of the details of the one-piece clip of the present invention, showing the radial gate embodiment, and omitting the specific details of the relatively rotatable members.

Referring now to the drawings in detail, wherein like numerals refer to like elements throughout the several views, one sees that FIGS. 1A–1D illustrate the radial gate embodiments of the clip 10 of the present invention, while FIGS. 2A–2D illustrate the linear gate embodiments of the clip 10 of the present invention. These embodiments are described in detail in parent application Ser. No. 09/004,432, filed on Jan. 8, 1998, entitled "One-Piece Swivel Clip", the disclosure of which is hereby incorporated by reference. FIGS. 1A–1D and 2A–2D do not illustrate the support bosses which are best illustrated in FIG. 9 and will be described hereinafter. Both of these embodiments include a base member 12 with a swivel aperture 14 through which the swivel shaft 16 of the swivel member 18 passes. Base member 12 and swivel member 18 are relatively rotatable with respect to each other and, in fact, in some applications, such as swivel clip 200 to be described hereinafter, may both be rotatable. Swivel member 18 includes upper disk 20 on an upper end thereof and lower disk 22 on a lower end thereof. FIGS. 1A–1D and 2A–2D omit the details of the base member 12 and the swivel member 18. Specific embodiments of base member 12 and swivel member 18 are illustrated in FIGS. 3–9.

The radial gate embodiments (FIGS. 1A–1D) and linear gate embodiments (2A–2D) differ, as will be explained in detail hereinafter, regarding the shape of the vestiges of the broken gates around the periphery of swivel aperture 14 on the base member 12 for supporting swivel shaft 16.

Figure 2A:
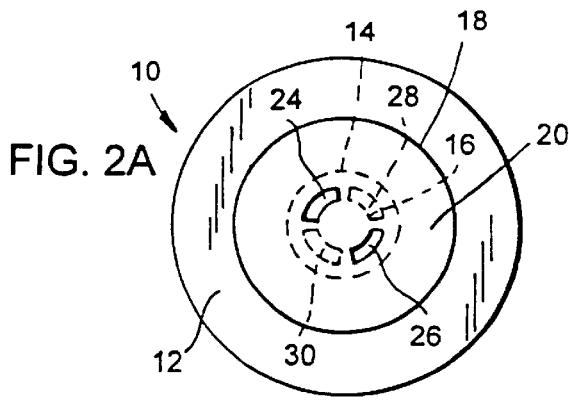
FIG. 2A is a top plan view, partly in cross section, of the details of the one-piece clip of the present invention, showing the linear gate embodiment, and omitting the specific details of the relatively rotatable members.
Figure 1B:
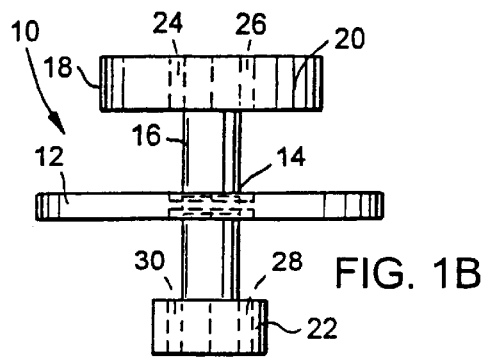
FIG. 1B is a top plan view, partly in cross section, of the details of the one-piece clip of the present invention, showing the radial gate embodiment and omitting the specific details of the relatively rotatable members.
Figure 2B:
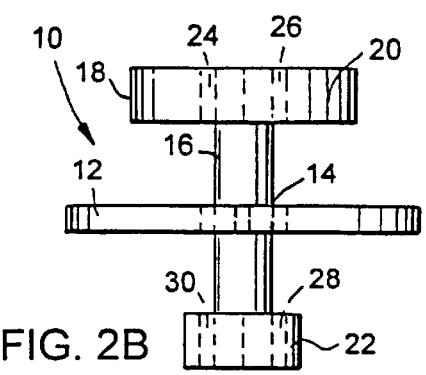
FIG. 2B is a top plan view, partly in cross section, of the details of the one-piece clip of the present invention, showing the linear gate embodiment, and omitting the specific details of the relatively rotatable members.
Figure 1C:
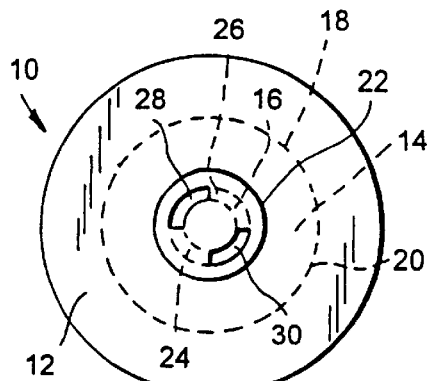
FIG. 1C is a bottom plan view, partly in cross section, of the details of the one-piece clip of the present invention, showing the radial gate embodiment, and omitting the specific details of the relatively rotatable members.
Figure 2C:
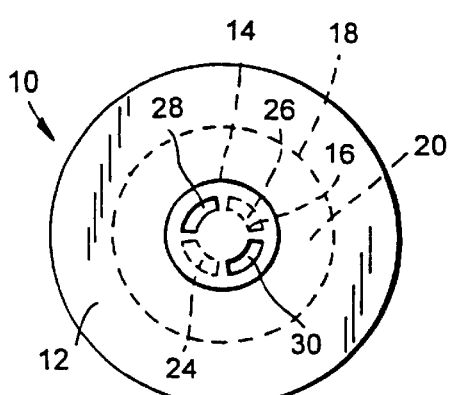
FIG. 2C is a bottom plan view, partly in cross section, of the details of the one-piece clip of the present invention, showing the linear gate embodiment, and omitting the specific details of the relatively rotatable members.
Figure 1D:
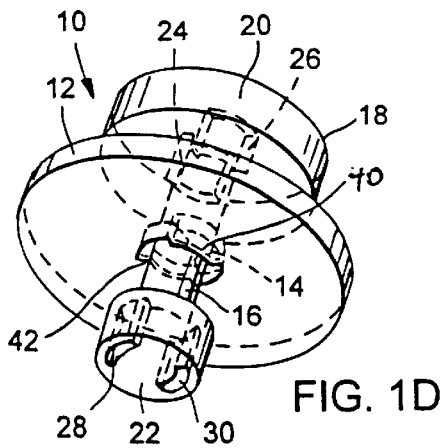
FIG. 1D is a perspective view, partly in cross section, of the details of the one-piece clip of the present invention, showing the radial gate embodiment, and omitting the specific details of the relatively rotatable members.
Figure 2D:
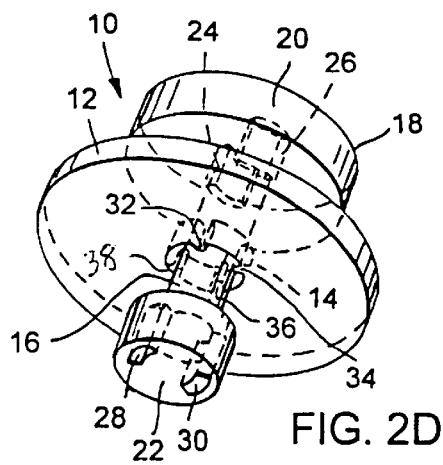
FIG. 2D is a perspective view, partly in cross section, of the details of the one-piece clip of the present invention, showing the linear gate embodiment, and omitting the specific details of the relatively rotatable members.

As shown in FIG. 1A, upper disk 20 includes windows 24, 26 which are illustrated from the 9–12 o'clock position and 3–6 o'clock position, respectively, immediately outwardly radially adjacent from shaft 16. Similarly, lower disk 22 includes windows 28, 30 which are illustrated in phantom in FIG. 1A from the 12–3 o'clock position and 6-9 o'clock position, respectively. This circumferential alternation of the windows 24, 26, 28, 30 results in a configuration with opposed windows. FIG. 1C illustrates a bottom view with the windows 24, 26, 28, 30 in consistent positions with windows 28, 30 shown directly and windows 24, 26 shown in phantom. FIGS. 2A and 2C are somewhat similar to FIGS. 1A and 1C but have windows 24, 26, 28, 30 of somewhat reduced circumferential range. As shown in FIG. 2D, this results in linear vestiges 32, 34, 36, 38 from the broken gates after base element 12 and swivel element 18 are separated after the molding process. In FIG. 1D, radial vestiges 40, 42 are formed from the broken gates after base element 12 and swivel element 18 are separated after the molding process.

During the molding process, windows 24, 26, 28, 30 meet in the base element 12, forming the swivel shaft 16, swivel aperture 14 and internal gates (which subsequently form linear vestiges 32, 34, 36, 38 or radial vestiges 40, 42) therebetween as a single piece. The opposition of the windows 24, 26, 28, 30 creates and strong joint between the base element 12 and the swivel shaft 16. After the gates are broken thereby allowing swivel shaft 16 to rotate within swivel aperture 14, the linear vestiges 32, 34, 36, 38 or radial vestiges 40, 42 provide support for swivel shaft 16 and further minimize side play.

The swivel clip embodiment 200 of the present invention is illustrated in FIGS. 3–5. Swivel clip 200 includes lower tubular clip 50 which is relatively rotatable with respect to upper tubular clip 66. Lower disk 22 is integral with an upper portion of lower tubular clip 50. Lower tubular clip 50 is formed of partially cylindrical wall 52 encompassing approximately 270° of circumference with a mouth 54 formed in the remaining approximately 90° with outwardly diverging walls 56, 58. Partially cylindrical wall 52 is further supported by support rib 60 which includes enlarged lower portion 62. The shape of lower tubular clip 50 allows mouth 54 to receive a tubular structural member (not shown). As the tubular structural member is urged into mouth 54, outwardly diverging walls 56, 58 spread to allow the tubular structural member to be received within partially cylindrical wall 52 and be engaged therewithin.

Upper tubular clip 66 includes partially cylindrical wall 70, mouth 72, outwardly diverging walls 74, 76 and support rib 78 with enlarged area 80 corresponding similar elements of lower tubular clip 50. Lower and upper tubular clips 50, 66 are rotationally oriented with respect to each other and the use of such term "base element" and "swivel element" is not meant to restrict which, if either, of the tubular clips are stationary and which can rotate.

Lower disk 22 is integral with swivel shaft 16 which is likewise integral with upper disk 20. Upper disk 20 is parallel to lower disk 22 and upwardly separated therefrom by swivel shaft 16. Swivel shaft 16 extends through swivel aperture 14 formed in base element 12. As illustrated in FIG. 4, lower disk 22 further includes radially oriented upwardly extending inverted V-shaped support boss 64. As illustrated in FIG. 5, swivel aperture 14 includes linear vestiges 32, 34, 36, 38 from the molding process as described above with respect to FIGS. 1A–1D and 2A–2D.

Upwardly extending inverted V-shaped support boss 64 contacts base element 12 which is integral with upper tubular clip 66. Base element 12 likewise includes radially oriented upwardly extending inverted V-shaped support boss 68 which contacts upper disk 20. The structure of support boss 64 contacting base element 12 and support boss 68 likewise contacting upper disk 20 provides positioning and spacing between lower clip 50 and upper clip 66 which rotate relative to each other. Furthermore, this configuration eliminates endplay between the lower clip 50 and upper clip 66 throughout a full revolution. Likewise, this configuration provides a plastic-to-plastic interface which is particularly long lasting.

During molding, typically support boss 64 is minimally connected to base element 12 and support boss 68 is minimally connected to upper disk 68 in order to eliminate any gas trap in the molding of the inverted V-shape, without necessarily providing additional gates for molding.

The swivel prong embodiment 300 of the present invention is illustrated in FIGS. 6–9. Swivel prong embodiment 300 includes prong 82 which is relatively rotatable with respect to clip 88. Prong 82 is generally cylindrically shaped and includes radially outwardly extending locking tabs 84, 85 and downwardly extending saucer-shaped flexible flange 86 for engaging an aperture in a panel (not shown). Prong 82 is configured as a hollow "box" prong in order to create the lower molding windows for forming the flash gate. Prong 82 could include anti-rotational elements, such as a flag for a keyhole slot, in a high torque application. Lower disk 22 is formed at an upper apex of downwardly extending saucer-shaped flexible flange 86 which is integral with swivel shaft 16 and upper disk 20.

Clip 88 is rotatable with respect to prong 82. Clip 88 includes base element 12 with aperture 14 at a central location thereof. Swivel shaft 16 passes through aperture 14. As illustrated in FIG. 6, swivel aperture 14 includes linear vestiges 32, 34, 36, 38 from the molding process as described above with respect to FIGS. 1A–1D and 2A–2D.

As shown in FIG. 9, upwardly extending inverted V-shaped support boss 64 is formed on lower disk 22 and extends upward to contact and position base element 12. Likewise, upwardly extending inverted V-shaped support boss 68 is formed on base element 12 and extends upwardly to contact and position upper disk 20, thereby eliminating endplay between clip 88 and prong 82. As previously described, it is envisioned that during the initial molding process, support boss 64 would be minimally joined with base element 12 and support boss 68 would be minimally joined with upper disk 20 in order to eliminate gas traps during molding, without necessarily providing additional gates for molding.

As shown in FIGS. 6–8, end walls 90, 92 and sidewalls 94, 96 extend upwardly from base element 12 of clip 88 to support lower gripping surface 98. Detent aperture 100 with detent inverted ledge 102 is formed on lower gripping surface 98 inwardly adjacent from end wall 90. Lower tubular gripping passageway 104 is formed passing longitudinally through sidewalls 94, 96, and approximately 270° of circumference formed through sidewalls 94, 96. Upper gripping surface 106 is formed on clamping member 108 which is attached to lower gripping surface 98 by living hinge 110. Upper gripping surface 106 includes detent prong 112 with detent hook 114 which is inserted into detent aperture 100, detent hook 114 engaging detent inverted ledge 102 in a closed position. Upper gripping surface 106 further includes upper tubular gripping passageway 116 which, when upper gripping surface 106 abuts lower gripping surface 98, aligns with lower gripping passageway 104 to form a cylindrical gripping passageway for gripping tubular members (not shown).

First semi-circular detent element 118 with first inwardly facing distal latching surface 119 extends upwardly from upper gripping surface 106 and likewise second semi-circular detent element 120 with second inwardly facing distal latching surface 121 extends upwardly from lower gripping surface 98, both about an axis formed in a central location of living hinge 110. Lower gripping surface 98 includes first semi-circular lateral groove 122 for receiving first semi-circular detent element 118 in the closed position. First latching ledge 123 within first semi-circular lateral groove 122 engages first inwardly facing distal latching surface 119. Likewise, upper gripping surface 106 includes second semi-circular lateral groove 124 for receiving second semi-circular detent element 120. Second latching ledge 125 within second semi-circular lateral groove 124 engages second inwardly facing distal latching surface 121.

Alignment protrusion 126 is formed on upper gripping surface 106 outwardly adjacent from second semi-circular lateral groove 124 for insertion in the closed position into alignment aperture 128 formed on lower gripping surface 98 formed outwardly adjacent from second semi-circular detent element 120.

To make swivel clip 10, the molding is performed with the base member 12, the swivel member 18 and all associated structure molded as a single piece, typically by injection molding or any similar plastic molding process. Windows 24, 26, 28, 30 meet in the base member 12, forming the swivel shaft 16, swivel aperture 14 and internal gates therebetween as a single piece.

To use swivel clip 200 or swivel prong 300, the user typically breaks the gates thereby forming linear vestiges 32, 34, 36, 38 or radial vestiges 40, 42 (and similarly breaks any of the above-described minimal contact of support bosses 64, 68 with base member 12 and upper disk 20 which were formed to eliminate gas traps during the molding process) and allowing swivel shaft 16 to rotate within swivel aperture 14. Linear vestiges 32, 24, 26, 38 or radial vestiges 40, 42 thereby provide support for swivel shaft 16. Alternately, this breaking can be done during the manufacturing process.

The subsequent steps for the user may vary with the application, the preferences of the user, and the details of the structure of the base member 12 and swivel member 18. A typical installation process for swivel clip 200 would be to engage the lower and upper clips 50, 66 to the respective tubular elements (not shown). A typical installation process for swivel prong 300 would be to insert prong 82 into an aperture of a panel (not shown) so that downwardly extending saucer-shaped flexible flange 86 urges against the panel. A tubular element (not shown) is then inserted laterally into lower gripping passageway 104 and clamping member 108 is rotated to the closed position so that upper tubular gripping passageway 116 forms a cylindrical passageway with lower gripping passageway 104 thereby gripping the tubular element. The securing of clamping member 108 to lower gripping surface 98 is performed by the insertion of detent prong 112 into detent aperture 100, and first and second semi-circular detent elements 118, 120 into first and second semi-circular lateral grooves 122, 124 as described above. Additionally, alignment protrusion 126 is inserted into alignment aperture 128.

Thus the several aforementioned objects and advantages are most effectively attained. Although preferred embodiments of the invention have been disclosed and described in detail herein, it should be understood that this invention is in no sense limited thereby and its scope is to be determined by that of the appended claims.

What is claimed is:

1. A clip including:

a first member including a planar surface with a first side and a second side;

a second member, including an upper surface, a lower surface and a swivel shaft between said upper surface and said lower surface, said swivel shaft passing through said planar surface of said first member, said second member being initially integral with said first member, said first and second members being joined by molding gates, said first and second members being subsequently rotatable with respect to each other after said molding gates are broken; and wherein said lower surface includes a first support boss contacting said first side of said planar surface, and said second side of said planar surface includes a second support boss contacting said upper surface.

2. The clip of claim 1 wherein said molding gates are formed by first molding windows and second molding windows, said first molding windows being formed on said upper surface of said second member and said second molding windows being formed on said lower surface of said second member, said first molding windows being opposed to said second molding windows whereby said first and second molding windows alternate about a periphery of said second member.

3. The clip of claim 2 wherein said swivel shaft passes through an aperture of said planar surface, said molding gates being formed between said aperture and said swivel shaft when said first member is initially integral with said second member, said molding gates being subsequently broken to form vestiges to support said swivel shaft in said aperture.

4. The clip of claim 3 wherein said first and second support bosses include radially oriented inverted V-shaped protrusions.

5. The clip of claim 4 wherein said first member includes means for attaching said first member to a first external object and said second member includes means for attaching said second member to a second external object.

6. The clip of claim 5 wherein said means for attaching said first member to a first external object comprises a first tubular clip and said means for attaching said second member to a second external object comprises a second tubular clip.

7. The clip of claim 5 wherein said means for attaching said first member to a first external object comprises a clamping structure for engaging a tubular object and said means for attaching said second member to a second external object comprises an element for extending through an aperture of said second external object and detent engaging said second external object.

* * * * *